United States Patent
Molnar et al.

(10) Patent No.: US 9,882,923 B2
(45) Date of Patent: Jan. 30, 2018

(54) AUTOMATIC CONTEXT-SENSITIVE SANITIZATION

(71) Applicant: MICROSOFT TECHNOLOGY LICENSING, LLC., Redmond, WA (US)

(72) Inventors: David Molnar, Seattle, WA (US); Benjamin Livshits, Kirkland, WA (US); Patrice Godefroid, Mercer Island, WA (US); Prateek Saxena, Berkeley, CA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 214 days.

(21) Appl. No.: 14/551,629

(22) Filed: Nov. 24, 2014

(65) Prior Publication Data
US 2015/0082439 A1  Mar. 19, 2015

Related U.S. Application Data

(63) Continuation of application No. 12/979,407, filed on Dec. 28, 2010, now Pat. No. 8,898,776.

(51) Int. Cl.
*H04L 29/06* (2006.01)
*G06F 21/54* (2013.01)
*G06F 21/56* (2013.01)

(52) U.S. Cl.
CPC .......... *H04L 63/1425* (2013.01); *G06F 21/54* (2013.01); *G06F 21/56* (2013.01); *G06F 21/566* (2013.01); *H04L 63/1433* (2013.01)

(58) Field of Classification Search
CPC ........ G06F 21/56; G06F 21/566; G06F 21/54; H04L 63/1433; H04L 63/1425
See application file for complete search history.

(56) References Cited

U.S. PATENT DOCUMENTS

| | | |
|---|---|---|
| 5,960,080 A | 9/1999 | Fahlman et al. |
| 2003/0121839 A1 | 7/2003 | Ryan et al. |
| 2006/0080554 A1 | 4/2006 | McDonald et al. |

(Continued)

OTHER PUBLICATIONS

Podjarny, Guy., "Developing Secure Web applications: An introduction to IBM Rational AppScan Developer Edition", Retrieved at << http://www.ibm.com/developerworks/rational/library/08/0916_podjarny/ >>, Sep. 16, 2008, pp. 13.

(Continued)

*Primary Examiner* — Kambiz Zand
*Assistant Examiner* — Ayoub Alata (57) ABSTRACT

An automatic context-sensitive sanitization technique detects errors due to the mismatch of a sanitizer sequence with a browser parsing context. A pre-deployment analyzer automatically detects violating paths that contain a sanitizer sequence that is inconsistent with a browsing context associated with outputting an untrusted input. The pre-deployment analyzer determines a correct sanitizer sequence which is stored in a sanitization cache. During the runtime execution of the web application, a path detector tracks execution of the web application in relation to the violating paths. The correct sanitizer sequence can be applied when the runtime execution follows a violating path.

20 Claims, 9 Drawing Sheets

(56) References Cited

U.S. PATENT DOCUMENTS

| | | |
|---|---|---|
| 2007/0074188 A1 | 3/2007 | Huang et al. |
| 2008/0184016 A1* | 7/2008 | Erlingsson .............. G06F 21/52 712/233 |
| 2008/0301076 A1 | 12/2008 | Timmins et al. |
| 2009/0119769 A1 | 5/2009 | Ross et al. |
| 2009/0165124 A1 | 6/2009 | Spektor |
| 2009/0319588 A1 | 12/2009 | Gandhi et al. |
| 2010/0031354 A1 | 2/2010 | Hudis et al. |

OTHER PUBLICATIONS

"Vulnerability Analysis of Web-based Applications", Retrieved at << http://www.cs.ucsb.edu/~vigna/publications/2007_cova_felmetsger_vigna_webvuln.pdf >>, pp. 33.

Cretu, et al., "Data Sanitization: Improving the Forensic Utility of Anomaly Detection Systems Introduction", Retrieved at << http://www.cs.columbia.edu/~angelos/Papers/2007/hotdep.pdf >>, In the Proceedings of the Third Workshop on Hot Topics in System Dependability, Jun. 2007, pp. 1-6.

"Sanitizing User Data: How and Where to do it", Retrieved at << http://www.diovo.com/2008/09/sanitizing-user-data-how-and-where-to-do-it/ >>, Sep. 11, 2008, pp. 4.

Balzarotti, et al., "Saner: Composing Static and Dynamic Analysis to Validate Sanitization in Web Applications", Retrieved at << http://iseclab.org/papers/oakland-saner.pdf >>, In Proceedings of the IEEE Symposium on Security and Privacy, May 18-22, 2008, pp. 1-15.

Bates, et al., "Regular expressions considered harmful in client-side xss filters", Retrieved at << http://www.collinjackson.com/research/xssauditor.pdf >>, In Proceedings of the 19th International World Wide Web Conference, Apr. 26-30, 2010, pp. 9.

Bisht, et al., "XSS-GUARD: precise dynamic prevention of cross-site scripting attacks", Retrieved at << http://www.cs.uic.edu/~pbisht/XSSGuard_DIMVA2008_bisht.pdf >>, Detection of Intrusions and Malware, and Vulnerability Assessment, 5th International Conference, DIMVA, Jul. 10-11, 2008, pp. 1-20.

Bojinov, et al., "XCS: Cross channel scripting and its impact on web applications", Retrieved at << http://bojinov.org/professional/ccs2009-xcs-paper.pdf >>, In proceedings of ACM Computer and Communications Security, Nov. 9-13, 2009, pp. 12.

Chen, et al., "An analysis of browser domain isolation bugs and a light-weight defense mechanism", Retrieved at << http://research.microsoft.com/pubs/73100/ScriptAccenting.pdf >>, In Proceedings of the ACM Conference on Computer and Communications Security, Oct. 29-Nov. 2, 2007, pp. 10.

Erlingsson, et al., "End-to-end web application security", Retrieved at << http://www.usenix.org/event/hotos07/tech/full_papers/erlingsson/erlingsson.pdf >>, Proceedings of the 11th Workshop on Hot Topics in Operating Systems, 2007, pp. 6.

Gundy, et al., "Noncespaces: using randomization to enforce information flow tracking and thwart cross-site scripting attacks", Retrieved at << http://www.cs.ucdavis.edu/~hchen/paper/noncespaces.pdf >>, In Proceedings of the 16th Annual Network and Distributed System Security Symposium, Feb. 8-11, 2009, pp. 1-18.

Haldar, et al., "Dynamic taint propagation for Java", Retrieved at << http://69.5.23.201/2005/papers/45.pdf >>, 21st Annual Computer Security Applications Conference, Dec. 5-9, 2005, pp. 9.

Hasegawa, Yosuke., "Utf-7 xss cheat sheet", retrieved at << http://openmya.hacker.jp/hasegawa/security/utf7cs.html >>, 2005, pp. 2.

Hooimeijer, et al., "Modeling imperative string operations with transducers", Retrieved at << http://research.microsoft.com/pubs/135524/bek-model-tr-2.pdf >>, Technical report, Microsoft Research, MSR-TR-2010-96, Jul. 19, 2010, pp. 1-12.

Howell, et al., "MashupOS: Operating system abstractions for client mashups", Retrieved at << http://research.microsoft.com/en-us/um/people/helenw/papers/mashupOSHotOS.pdf >>, In Proceedings of the Workshop on Hot Topics in Operating Systems, May 2007, pp. 7.

Huang, et al., "Securing Web application code by static analysis and runtime protection", Retrieved at << http://www.iis.sinica.edu.tw/~dtlee/dtlee/DSN2004_web_huang.pdf >>, The 2004 World Wide Web Conference (in conjunction with ACM Conference on Electronic Commerce [EC'04]), May 17-22, 2004, pp. 12.

Jim, et al., "Defeating script injection attacks with browser-enforced embedded policies", Retrieved at << http://www2007.org/papers/paper595.pdf >>, 16th International World Wide Web Conference, May 8-12, 2007, pp. 601-610.

Jovanovic, et al., "Pixy: A static analysis tool for detecting Web application vulnerabilities (short paper)", Retrieved at << http://citeseerx.ist.psu.edu/viewdoc/download?doi=10.1.1.60.6774&rep=rep1&type=pdf >>, IEEE Symposium on Security and Privacy, May 21-24, 2006, pp. 6.

Kiezun, et al., "HAMPI: A solver for string constraints", Retrieved at << http://people.csail.mit.edu/akiezun/issta54-kiezun.pdf >>, International Symposium on Software Testing and Analysis, Jul. 19-23, 2009, pp. 11.

Livshits, V. Benjamin., "Finding security errors in Java programs with static analysis", Retrieved at << http://suif.stanford.edu/~livshits/papers/acsac04v.pdf >>, In Proceedings of the Usenix Security Symposium, 2005, pp. 2.

Livshits, et al., "Merlin: Specification inference for explicit information flow problems", Retrieved at << http://citeseerx.ist.psu.edu/viewdoc/download?doi=10.1.1.152.6112&rep=rep1&type=pdf >>, ACM SIGPLAN Conference on Programming Language Design and Implementation, Jun. 15-21, 2009, pp. 75-86.

Louw, et al., "Blueprint: Robust prevention of cross-site scripting attacks for existing browsers", Retrieved at << http://citeseerx.ist.psu.edu/viewdoc/download?doi=10.1.1.153.4483&rep=rep1&type=pdf >>, In 30th IEEE Symposium on Security and Privacy, May 2009, pp. 16.

Martin, et al., "SecuriFly: runtime vulnerability protection for Web applications", Technical report, Stanford University, 2006.

Meyerovich, et al., "ConScript: Specifying and enforcing fine-grained security policies for JavaScript in the browser", Retrieved at << http://people.csail.mit.edu/costan/readings/oakland_papers/conscript.pdf >>, In IEEE Symposium on Security and Privacy, May 16-19, 2010, pp. 16.

Nadji, et al., "Document structure integrity: A robust basis for cross-site scripting defense", Retrieved at << http://www.cs.berkeley.edu/~prateeks/papers/dsi-ndss09.pdf >>, Proceedings of the Network and Distributed System Security Symposium, NDSS, Feb. 8-11, 2009, pp. 20.

Nguyen-Tuong, et al., "Automatically hardening Web applications using precise tainting", Retrieved at << http://dependability.cs.virginia.edu/publications/2005/sec2005.pdf >>, Security and Privacy in the Age of Ubiquitous Computing, IFIP TC11 20th International Conference on Information Security, May 30-Jun. 1, 2005, pp. 1-12.

"Open Web Application Security Project. The ten most critical Web application security vulnerabilities", Retrieved at << http://www.owasp.org/images/e/e8/OWASP_Top_10_2007.pdf >>, 2007, pp. 1-35.

Pietraszek, et al., "Defending against injection attacks through context-sensitive string evaluation", Retrieved at << http://citeseerx.ist.psu.edu/viewdoc/download?doi=10.1.1.59.3182&rep=rep1&type=pdf >>, Recent Advances in Intrusion Detection, 8th International Symposium, RAID, Sep. 7-9, 2005, pp. 1-26.

Reis, et al., "BrowserShield: Vulnerability-driven filtering of dynamic HTML", Retrieved at << http://research.microsoft.com/en-us/um/people/helenw/papers/bshield-osdi2006.pdf >>, In Proceedings of the Operating System Design and Implementation, 2006, pp. 14.

Snake, R., "XSS cheat sheet for filter evasion", Retrieved at << http://ha.ckers.org/xss.html >>, Retrieved Date: Jan. 4, 2011, pp. 20.

Schwartz, et al., "All you ever wanted to know about dynamic taint analysis and forward symbolic execution (but might have been afraid to ask)", Retrieved at << http://people.csail.mit.edu/costan/readings/oakland_papers/dynamic_taint_analysis.pdf >>, 31st IEEE Symposium on Security and Privacy, May 16-19, 2010, pp. 15.

(56) References Cited

OTHER PUBLICATIONS

Venter, et al., "Common Compiler Infrastructure: Metadata API", Retrieved at << http://ccimetadata.codeplex.com/ >>, Retrieved Date: Jan. 4, 2011, pp. 1.

Xie, et al., "Static detection of security vulnerabilities in scripting languages", Retrieved at << http://theory.stanford.edu/~aiken/publications/papers/usenix06.pdf >>, 15th USENIX Security Symposium, Jul. 2006, pp. 1-14.

Xu, et al., "Taint-enhanced policy enforcement: A practical approach to defeat a wide range of attacks", Retrieved at << http://citeseerx.ist.psu.edu/viewdoc/download?doi=10.1.1.75.5942&rep=rep1&type=pdf >>, 15th USENIX Security Symposium, Jul. 2006, pp. 16.

Yu, et al., "Better Abstractions for Secure Server-Side Scripting", Retrieved at << http://www2008.org/papers/pdf/p507-yuA.pdf >>, The 17th International World Wide Web Conference, Apr. 21-25, 2008, pp. 507-516.

Zalewski, M., "Browser Security Handbook", 2010.

Livshits, et al., "SECURIFLY: Runtime Protection and Recovery from Web Application Vulnerabilities", Retrieved at <<http://collective.stanford.edu/~livshits/papers/pdf/secruifly_tr.pdf>>, Retrieved Date: Jan. 9, 2011, pp. 58.

\* cited by examiner

AUTOMATIC CONTEXT-SENSITIVE SANITIZATION

CROSS-REFERENCE TO RELATED APPLICATIONS

This application is a continuation of Ser. No. 12/979,407, filed on Dec. 28, 2010, entitled "AUTOMATIC CONTEXT-SENSITIVE SANITIZATION", the entirety of which is incorporated herein by reference.

BACKGROUND

Cross-site scripting is a security exploit in which an attacker inserts malicious script into a link produced by a trust web server. A browser executes the injected code as if it were provided by the server. Since the security restrictions of a browser are based on the origin of the web page, the malicious script is executed by the browser under the same permission as the domain of the web application, thereby by-passing the security restrictions.

For example, consider a web site that, after a user logs in, redirects the user to a welcome page that returns content based on information passed in the URL (e.g., www.1a2b.com/default.asp?name=username) that when rendered at the client, greets the user by a username that was provided. However, if the malicious script instead of a username is provided, vulnerable servers will pass back the malicious script, and when the welcome page is rendered, the malicious script is executed on the client side. Thus, if an attacker tricks the user into clicking on a link to that site with the malicious script sent to the server instead of the username (e.g., www.1a2b.com/default.asp?name=script=<script>evilScript()</script>), the web site passes back the code embedded in its content, as if it were the username.

When the browser interprets this part of the content as script, the browser automatically runs the script, which is normal browser behavior. However, because the script came from the web site, the script is able to instruct the browser to perform operations in that site's domain, including sending the user site's cookies to another computer. In this manner, cross-site scripting is used to steal a user's sensitive data.

Sanitization is a process that attempts to prevent cross-site scripting by validating the external input. Typically, a sanitizer checks an external input for values that are defined in accordance with an input specification. External inputs that are deemed untrusted are transformed into a representation that is no longer dangerous. For example, the input sanitizer may try to remove all JavaScript code from the input.

In some situations, the sanitizers are placed in a web application manually by one or more programmers. In this situation, the choice of a sanitizer relies on the expertise of the web developer who may have limited security skills. In another situation, the sanitizers can be automatically added into a web application through special primitives that encode HTML output in a safe way. However, this technique requires modifying the web application to include the special primitives and modifying a web browser to recognize the special primitives. For legacy web applications that are already deployed in existing systems or products, these modifications may not be feasible or may be too costly to implement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

An automatic context-sensitive sanitization technique mitigates cross-site scripting vulnerabilities by preventing errors that arise from mismatches in the placement of a sanitizer with a wrong browser parsing context. A browser parsing context is a state of the web browser when the web browser is parsing the contents of a web application at a specific point. The technique considers the parsing context at the point where a web browser renders an untrusted input in an output stream. By matching a sequence of sanitizers with the browser parsing context of an untrusted input in this manner, the sequence of sanitizers will work properly to validate the untrusted input.

In an example embodiment, the automatic context-sensitive sanitization technique executes in two phases. In a pre-deployment phase, an intensive performance analysis of a web application having sequence of sanitizers embedded therein. The analysis is made to determine mismatches between the embedded sequence of sanitizers and their respective browser parsing context. The analysis produces violating paths and a correct sequence of sanitizers which match a respective browser parsing context. A violating path is an execution trace that uses an incorrect sequence of sanitizers to validate an untrusted input prior to outputting the untrusted input in an output stream. An execution trace is a path through the web application taken by the untrusted input during runtime that leads to rendering the untrusted input in an output stream. A sanitization cache stores the correct sequence of sanitizers which are then applied when the web application executes on the same path as a violating path.

In a runtime phase, a monitoring and repair technique automatically implements the correct sanitization sequence. A path detector, executing on a web server, monitors execution of the web application by a web browser in order to determine when the web application is executing on the same path as a violating path. In this case, the correct sequence of sanitizers is applied prior to outputting the untrusted input.

DETAILED DESCRIPTION

Overview

Embodiments of an automatic context-sensitive sanitization technique that prevents errors due to the mismatch of a sanitizer sequence with a browser parsing context is described herein. A web application includes sanitizers that validate inputs passed by a client to a web application. Sanitizers are processes that transform an input into a representation that is no longer dangerous. For example, a sanitizer can remove or replace certain characters in an input or truncate the length of an input. The sanitizers are applied to an input before the input is used in a critical operation, such as being output back to a browser via the HTML output stream. A sanitizer works correctly when placed in a position that matches the browser parsing context of the output stream that renders an untrusted input. The technique analyzes whether an embedded sanitizer sequence is matched correctly with its browser parsing context.

In the first phase, a pre-deployment analyzer analyzes a web application to determine the correct sequence of sanitizers that should be applied to an untrusted input taking into consideration the browser parsing context of the output stream of the untrusted input. If a mismatch is detected, a corrected sequence of sanitizers is determined and then saved in a sanitization cache. An execution trace tracking the data flow path of the untrusted input to the output stream is saved as a violating path.

In the second phase, a runtime engine tracks execution of the web application on a web server with the violating paths. A path detector, executing on the web server, is used to determine when the web application is executing on a violating path. In that case, the runtime engine applies the correct sequence of sanitizers before rendering the untrusted input in an output stream.

Embodiments of the automatic context-sensitive sanitization technique can be used to mitigate two common sanitization errors that lead to cross-site scripting: inconsistent sanitization; and unsafe multiple sanitization. Both of these errors are based on a mismatch of a sanitizer with a browser parsing context. A browser parsing context is a state of the web browser when the web browser is parsing the contents of a web page at a specific point. An inconsistent sanitization error occurs when a single sanitizer does not match the browser parsing context of untrusted input that is rendered in an output stream. If a sanitizer does not match the browser parsing context, the sanitizer will not work.

The following HTML code fragment is part of an example that illustrates inconsistent sanitization:

```
<a href = "javascript: document.write('...');">
    Diapers
</a>
<script>
    var name = 'Stewie';
</script>
```

In this particular example above, assume a web developer applies an HtmlEncode sanitizer, which is configured to sanitize only HTML attributes, to both Diapers and Stewie. Assume further that Diapers is inside a browser parsing context associated with an HTML attribute and Stewie is inside a browser parsing context associated with a JavaScript tag. In this example, the use of the same sanitizer in two different browser parsing contexts is incorrect. The use of the HtmlEncode sanitizer for Stewie is inside a browser parsing context associated with a JavaScript tag. The use of the HtmlEncode sanitizer with Diapers is inside a browser parsing context associated with an HTML attribute. In this example, the placement of the same sanitizer in two different browser parsing contexts is inconsistent with the sanitizer's function. As such, the sanitizer would not work properly thereby allowing a hacker the opportunity to input strings that can lead to malicious code execution. In this particular example, the sanitizer JSStringEncode should be used for Stewie since its browser parsing context is a JavaScript string. The sanitizer HtmlEncode is correct to sanitize Diapers since the browser parsing context for Diapers is an HTML attribute.

Unsafe multiple sanitization errors occur when a sequence of sanitizers is applied to an untrusted input, but the result of the application of the sequence of sanitizers on the untrusted input does not match the browser parsing context. The term sequence of sanitizers refers to a sequence having one or more sanitizers in succession. This occurs frequently in nested contexts and is due to the fact that sanitizers are not commutative.

The following HTML code fragment is part of an example that illustrates unsafe multiple sanitization:

```
<script>
    document.write (' <a href = " userlink "></a>');
</script>
```

The function, document.write() places an untrusted string, userlink, in a double-quoted href attribute which is nested inside a Javascript string. Assume there is a sanitizer written in the ECMA-SCRIPT scripting language known as EcmaScriptStringEncode, that is used to sanitize strings that are Unicode encoded. Unicode is an encoding scheme that uses codes to represent text. Assume there is another sanitizer, HtmlAttribEncode, that is used to sanitize HTML encoded attributes. In the example above, the sanitizer, EcmaScriptStringEncode is applied for a JavaScript string browser parsing context, and the sanitizer, HtmlAttribEncode, is applied for a HTML attribute browser parsing context. The EcmaScriptStringEncode sanitizer transcodes all dangerous characters, such as the double-quote character ("), to a Unicode. A dangerous character is an unrecognizable character. The Unicode corresponding to the double-quote character is the code \u022. The HtmlAttribEncode sanitizer encodes dangerous characters in a different manner. The HtmlAttribEncode sanitizer encodes the double-quote character as the character ".

In the example above, there are two possible sanitizer sequences:

document.write ('<a href="+HtmlAttribEncode
(JSStringEncode (userlink))     (1)

document.write ('<a href="+JSStringEncode(HtmlAttribEncode (userlink))     (2)

The application of both these sanitization sequences produces different results. This is because most common sanitizers are not commutative. In other words, if two sanitizers A and B are applied to the string S, the order of application matters. For example, A (B(S)) does not equal B(A(S)) and hence, A and B are not commutative.

The first sanitization sequence is erroneous and the second sanitization sequence is correct. In the first sequence, the sanitizer JSStringEncode first encodes the dangerous double-quote character (") as the unicode \u022. The HtmlAttribEncode sanitizer does not recognize Unicodes so the HtmlAttribEncode sanitizer will not sanitize the Unicode. When this sanitization sequence is executed, the untrusted data, "userlink", is first placed in the JavaScript string literal browser parsing context. The browser will then be in the HTML attribute context after the document.write function executes. The HtmlAttribEncode sanitizer will not work properly thereby allowing an attack string, such as "onclick=. ." to be transformed into the string "\u0022 onclick=. . . .". This attack string will be converted to its original form after the Unicode decoding occurs in the web browser. The double-quotes inserted in the string ("onclick=. . .") will take the browser out of the HTML href attribute context and into an unknown and possibly dangerous context.

Figure 1:
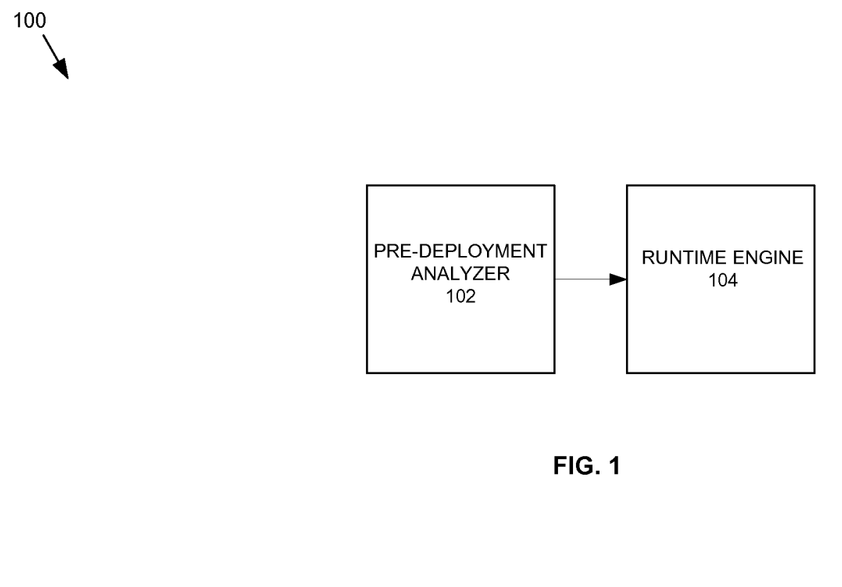
FIG. 1 illustrates an exemplary block diagram of a system for automatic context-sensitive sanitization.

Attention now turns to an overview of a system for automatic context-sensitive sanitization. Referring to FIG. 1, the system 100 operates in two phases. In the first phase, a pre-deployment analyzer 102 analyzes a web application to determine the correct sequence of sanitizers that should be applied to an untrusted input taking into consideration the browser parsing context of the output stream of the untrusted input. The corrected sequence of sanitizers is then saved in a sanitization cache. In addition, an execution trace tracking the data flow path of the untrusted input to the output stream is saved as a violating path. The violating paths and correct sequence of sanitizers are saved in files separate from the web application and used during the runtime execution of the web application.

In the second phase, a runtime engine 104 tracks execution of the web application with the violating paths. A path detector is used to determine when the web application is executing on a violating path in order to apply the correct sequence of sanitizers. Attention now turns to a more detailed description of the pre-deployment analyzer.

Pre-Deployment Analyzer

Figure 2:
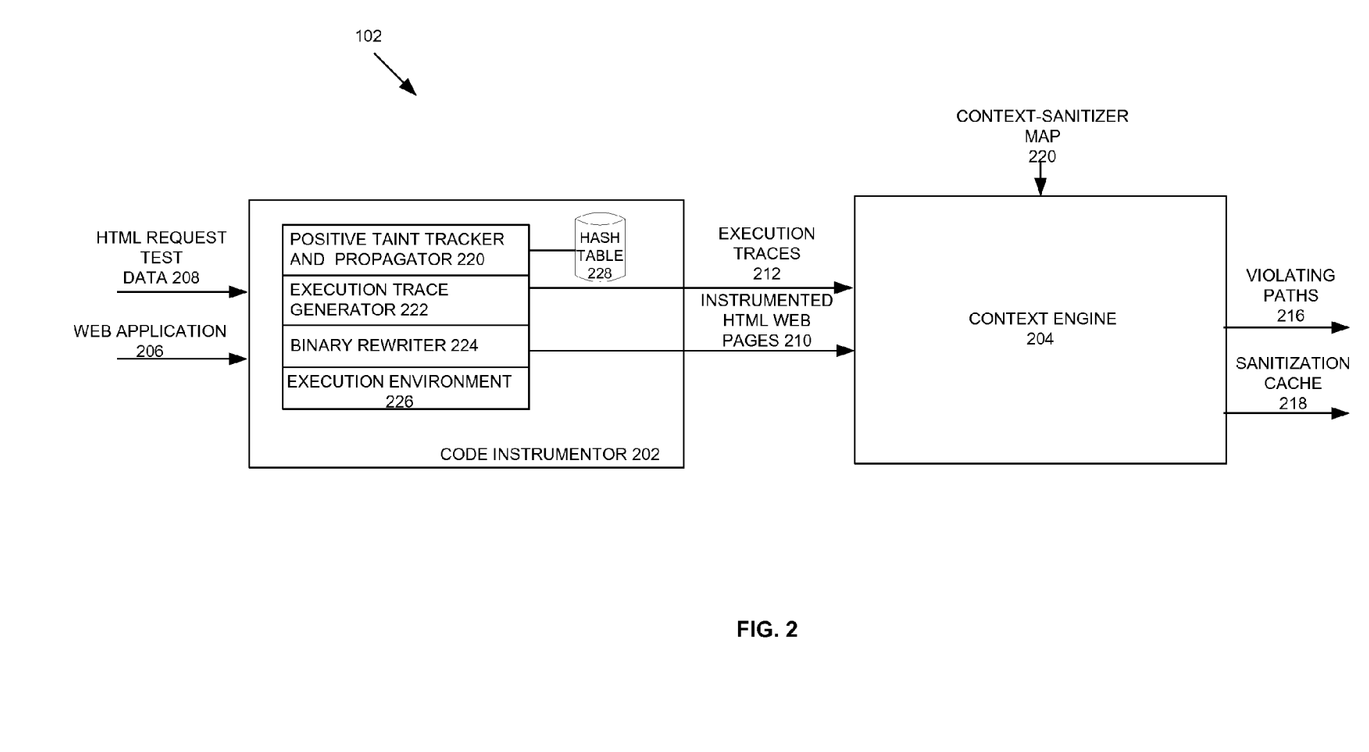
FIG. 2 illustrates an exemplary block diagram of the pre-deployment analyzer.

Turning to FIG. 2, there is shown an exemplary block diagram of the pre-deployment analyzer 102 having a code instrumentor 202 and a context engine 204. The code instrumentor 202 executes a web application 206 using a test suite of HTML request test data 208 and generates instrumented web pages 210 having special markers that are inserted to identify a particular sanitizer and its associated execution trace. The instrumented web pages 210 and the execution traces 212 are then used by the context engine 204 to determine the violating paths 216 and the correct sequence of sanitizers 218.

The code instrumentor 202 uses several techniques to analyze the web application 206. The code instrumentor 202 contains a positive taint tracker and propagator 220, an execution trace generator 222, a binary rewriter 224, and other procedures and data structures associated with an execution environment 226.

The positive taint tracker and propagator 220 marks certain data as safe or trusted and tracks the flow and propagation of the trusted data in the application. The positive taint tracker and propagator 220 stores the trusted data into a hash table 228. The execution trace generator 222 uses a graphical representation to trace a path of the untrusted data during execution of the web application to a sink node that outputs the untrusted data to an HTML output stream.

The binary rewriter 224 is configured to instrument the binary representation of a web application with special markers. Binary instrumentation is applicable to programming code written in certain languages, such as C, C#, C++, and assembly code. The binary rewriter 224 rewrites the binary code of the web application into web pages with the additional special markers inserted. The special markers indicate the particular sanitizer currently used and an identifier representing the associated execution trace. The special markers will be used by the context engine to identify a correct sanitizer(s) with the execution trace in the event the current sanitizer(s) does not match its browser parsing context. The execution environment 226 provides the framework for executing the binaries, such as the .NET framework and can include, without limitation, runtime libraries, metadata, etc.

The context engine 204 receives the execution traces 212, the instrumented web pages 210, and a context-sanitizer map 220. The context-sanitizer map 220 is typically constructed by a web developer and contains a list of sanitizers and the browser parsing contexts in which a sanitizer is applied. The following table illustrates an exemplary context-sanitizer map 220. As shown in the table below, for each specific HTML browser parsing context, one or more sanitizers can be applied. As shown in the table below, there are a number of exemplary HTML browser parsing contexts. The sanitizers are exemplary and are named to reflect the type of untrusted inputs that the sanitizer is configured to operate on.

| HTML Browser Parsing Context | Sanitizer |
|---|---|
| HTML Tag Content | HTMLEncode, SimpleTextFormatting |
| Double Quoted Attribute | HTMLAttribEncode |
| Single Quoted Attribute | HTMLAttribEncode |
| URL Path Attribute | URLPathEncode |
| URL Key-Value Pair | URLKeyValueEncode |
| In Script String | EcmaScriptStringEncode |
| CDATA | HTMLEncode |
| Style | Alpha - numerics |

The context engine 204 parses the instrumented HTML web pages 210 to determine the correct sequence of sanitizers to use in a browser parsing context that outputs untrusted data. The context engine 204 can be a web browser that is capable of recognizing the special markers. The context engine 204 parses an instrumented HTML web page 210 to determine the browser parsing context and then refers to the context-sanitizer map 220 to determine if the correct sequence of sanitizers is being applied at the browser parsing context. If an incorrect sequence of sanitizers is used in the browser parsing context, the execution trace is marked as a violating path 216. The sanitizer sequence is corrected and saved in the sanitization cache 218.

The following table below illustrates an exemplary sanitization cache 218. As shown, each entry in the sanitization cache 218 contains an identifier representing a violating path 216 and the corresponding corrected sanitizer sequence. As shown below, the sanitizer sequence can include one or more sanitizers.

| Violating Path Identifier | Sanitizer Sequence |
|---|---|
| Path 1 | EcmaScriptStringEncode, EcmaScriptStringEncode |
| Path 2 | EcmaScriptStringEncode |
| Path 3 | HtmlAttribEncode |
| Path 4 | HtmlAttribEncode, EcmaScriptStringEncode |

Attention now turns to a more detailed description of the pre-deployment analyzer 102. The description of the pre-deployment analyzer 102 refers to a web application written in an object-oriented code such as C# and tested in a .NET framework having the requisite runtime libraries, metadata, and tools to perform the code instrumentation. It should be noted that although this description is described with respect to compiler techniques associated with C# and the .NET framework, the technology described herein is not constrained to these techniques and that any other type of web development code, compilers, tools, libraries, and execution environments can be utilized as well.

Figure 3:
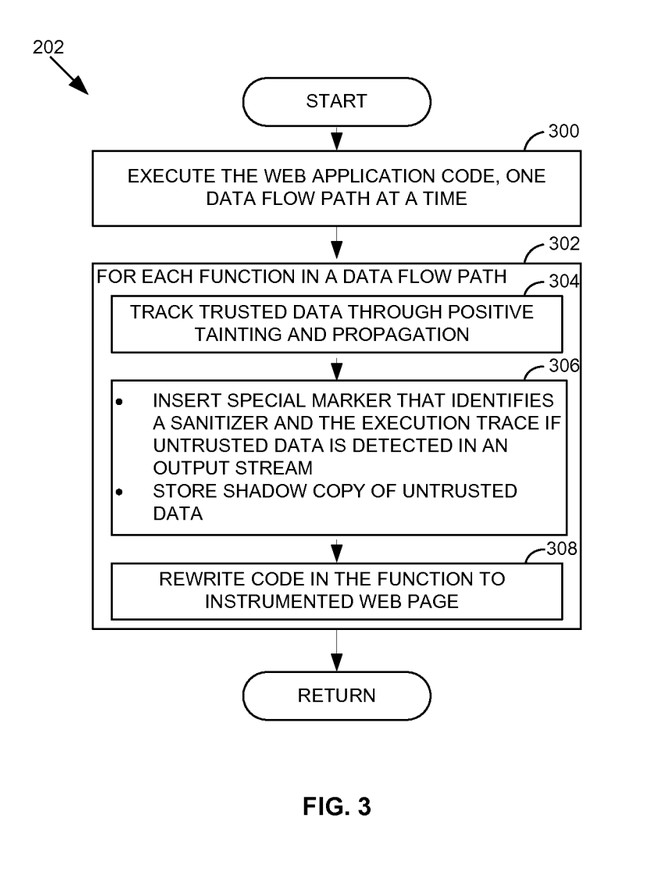
FIG. 3 illustrates a computer-implemented method of the code instrumentor.

FIG. 3 illustrates exemplary processing steps used by the code instrumentor 202. Turning to FIG. 3, the code instrumentor 202 executes the binary code of a web application 206, using a test suite of HTML request test data 208 (step 300). In particular, the web application 206 executes one data flow path at a time (step 300). A data flow path contains execution nodes, where each execution node represents a function. A function is a basic block having a single entry point that is reached from outside the function and has one or more exit points that transfers control to a point outside of the function.

The code instrumentor 202 traverses each function in a data flow path (step 302) and analyzes the binary code contained therein. Trusted data is tracked through positive tainting and propagation (step 304). Positive tainting is used to identify, mark, and track trusted data that does not require sanitization. Examples of trusted data include constants, such as constant strings, and other data that is defined in a web application. Positive tainting is advantageous since it eliminates the problem of incompleteness that is caused by not identifying relevant data that should be marked as untrusted. With positive tainting, incompleteness leads to false positives but not to untrusted data escaping detection. Positive taint propagation is the process of tracking positively tainted data while the data is used and manipulated at runtime. For example, constant strings are considered to be positively tainted. Additionally, the positive taint propagation identifies all relevant string operations and accounts for their effect on the positively tainted data. Positive taint propagation consists of tracking the positively tainted data while the data is used and manipulated during execution. The positive taint tracker and propagator 220 tracks the trusted data by storing a representation of the trusted data in a hash table 228. Data that is not stored in the hash table 228 is considered to be untrusted data.

Positive tainting is used since trusted data can be identified easily and more accurately than untrusted data. In positive tainting, failure to positively taint a data element results in the data element being considered untrusted and sanitized. As such, in positive tainting, failure to identify a trusted data element does not result in failing to validate an untrusted data element. By contrast, in negative tainting, failure to identify data as untrusted results in untrusted data not being sanitized.

When a sanitizer is found in a function, the input data associated with the sanitizer is checked to determine if it is an untrusted input (step 306). An untrusted input is one that does not have a corresponding entry in the hash table 228. If the input data associated with the sanitizer is an untrusted input, the execution trace that leads to the output stream that outputs the untrusted input is recorded by the execution trace generator 222 (step 306). The execution trace is the sequence of functions leading up to the output stream. If the function contains a sanitizer with an untrusted input, special markers are inserted which indicate the type of sanitizer and the path identifier representing the execution trace (step 306). Next, all code in the function is then rewritten out to an instrumented HTML web page by the binary rewriter 224 (step 308).

Figure 4:
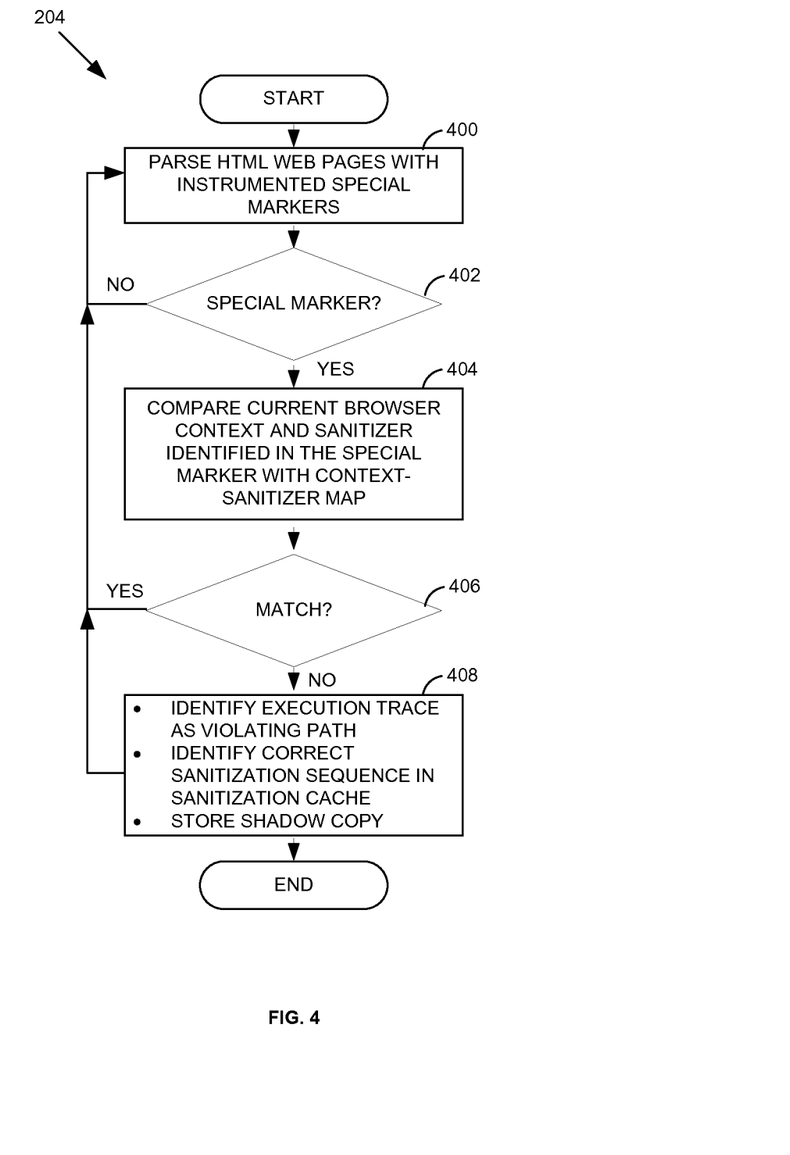
FIG. 4 illustrates a computer-implemented method of the context-engine.

FIG. 4 illustrates exemplary processing steps used by the context engine 204. The context engine 204 parses each instrumented HTML web page (step 400). The context engine 204 is configured to recognize the special markers. When the context engine 204 recognizes a special marker (step 402—Yes), the context engine 204 compares its current browser parsing context with the sanitizer identified in the special marker with the context-sanitizer map 220. Otherwise (step 402—No), the context engine 204 continues to parse the HTML web page (step 400).

If the context-sanitizer map 220 does not have a match for the current browser parsing context and the sanitizer denoted by the special marker (step 406—No), then the execution trace identified in the special marker is tagged as a violating path (step 408). In addition, the sanitizer sequence indicated in the context-sanitizer map 220 is recorded in the sanitization cache 218 (step 408). A shadow copy of the untrusted input is also stored. A shadow copy is a copy of the untrusted input that will be sanitized when the web page is executed. Otherwise, if there is a match (step 406—Yes), the context engine 204 does not tag the execution trace as a violating path or provide a corrected sanitizer sequence in the sanitization cached 218. In this case, there is a match between the sanitizer sequence and the browser parsing context and as such, does not require any corrective actions. These steps are repeated for each web page. When the context engine 204 completes processing, all violating paths will be identified along with the corrected sequences of sanitizers in the sanitization cache. Attention now turns to the runtime execution phase.

Runtime Engine

Figure 5:
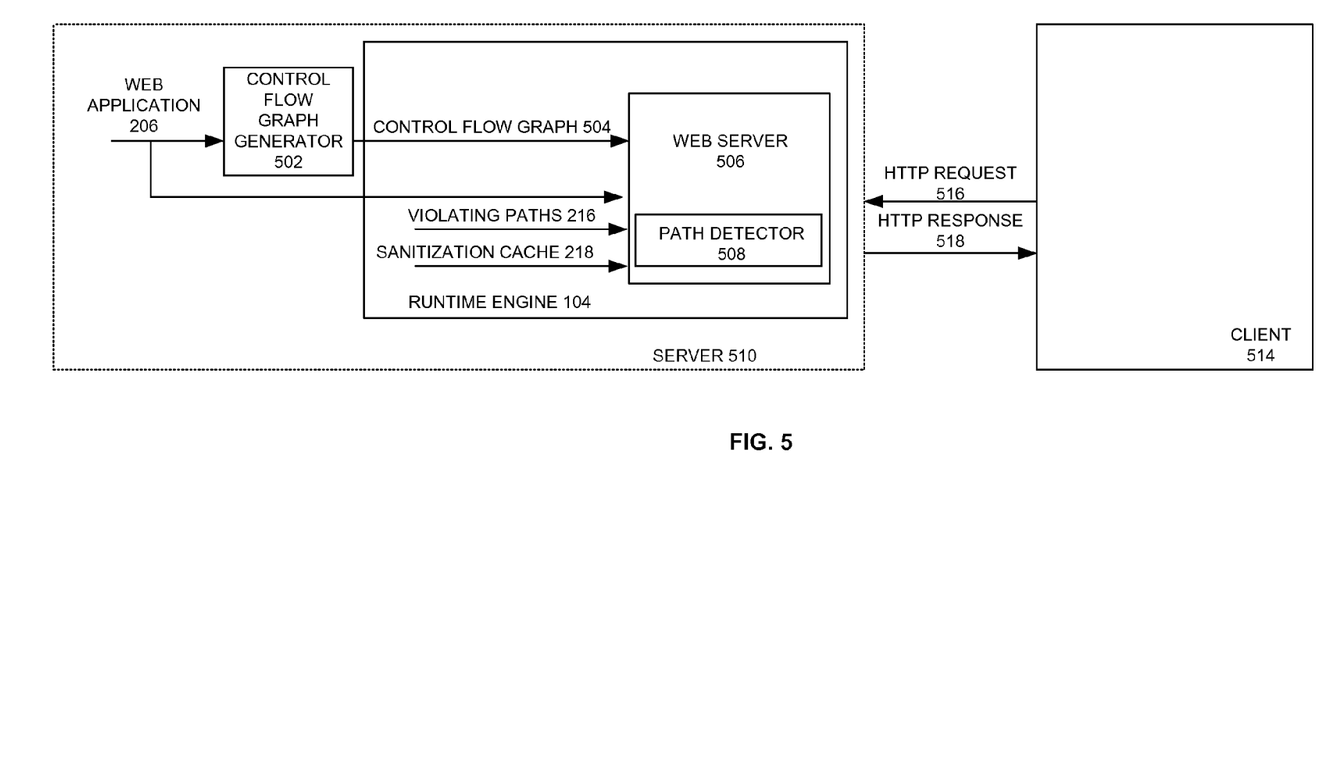
FIG. 5 illustrates an exemplary block diagram of the runtime engine.

FIG. 5 illustrates an exemplary runtime engine 104 deployed on a server 510. The runtime engine 104 uses a control flow graph generator 502 to generate a control flow graph 504 representing the web application 206. A control flow graph 504 is a graphical representation of all the paths that can be traversed during execution of the web application 206. The control flow graph 504 is generated once prior to the deployment of the web application 206 and used by a web server program 506.

The web server 506 is a program that executes the web application 206 and manages the communications between a client 514 and the server 510 for web pages and content through a series of HTTP requests 516 and HTTP responses 518. The web server 506 contains a path detector 508 that tracks the execution of the web application 206 with the violating paths 216. The web server 506 will apply the corrected sequence of sanitizers when the runtime execution of the web application follows a violating path.

Figure 6:
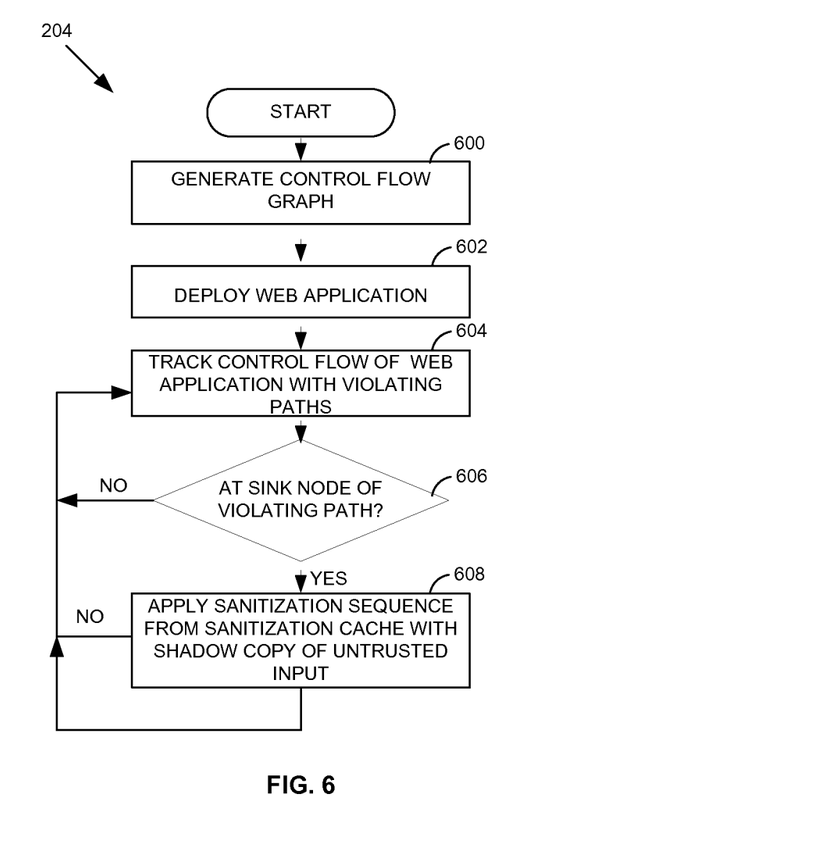
FIG. 6 illustrates a computer-implemented method of the runtime engine.

Referring to FIG. 6, there is shown exemplary processing steps used by the runtime engine 104. Initially, the control flow graph generator 502 creates a control flow graph of the web application 206 (step 600). When the web application 206 is deployed (step 602), the path detector 508 tracks execution of the web application 206 through the control flow graph 504 (step 604). When the path detector 508 is at a sink node associated with a violating path (step 606—Yes), the path detector 508 applies the associated sanitization sequence stored in the sanitization cache 218. The shadow copy of the untrusted input is used in the application of the sanitization sequence (step 608). This process continues while the web application is operational (step 606—No).

The preceding description described the context of computer-executable instructions used to facilitate the automatic context-sensitive sanitization technology. Attention now turns to a description of exemplary computing systems and computing environments that can be used to perform these instructions. Those skilled in the art will appreciate that the technology described herein is not constrained to the exemplary computing system and environments described below and that other configurations are possible.

Computing Environment

Figure 7:
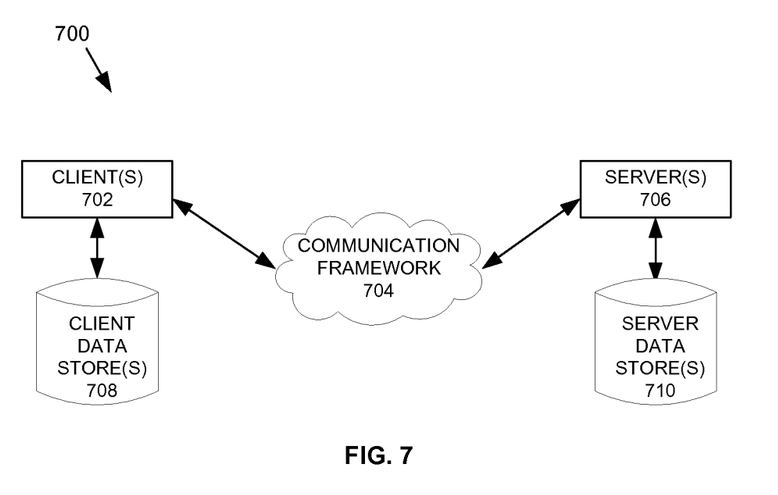
FIG. 7 illustrates an exemplary block diagram of a computing environment for automatic context-sensitive sanitization.

Referring now to FIG. 7, there is shown a schematic block diagram of an exemplary computing environment 700 for automatic context-sensitive sanitization. The environment 700 includes one or more client(s) 702 in communication through a communications framework 704 with one or more server(s) 706. The client 702 can be embodied as a hardware device, a software module, or as a combination thereof. Examples of such hardware devices can include, but are not limited to, a computer (e.g., server, personal computer, laptop, etc.), a cell phone, a personal digital assistant, or any type of computing device, and the like. The client 702 can also be embodied as a software module having instructions that execute in a single execution path, multiple concurrent execution paths (e.g., thread, process, etc.), or in any other manner.

A server 706 can be embodied as a hardware device, a software module, or as a combination thereof. Examples of such hardware devices can include, but are not limited to, a computer (e.g., server, personal computer, laptop, etc.), a cell phone, a personal digital assistant, or any type of computing device, and the like. The server 706 can also be embodied as a software module having instructions that execute in a single execution path, multiple concurrent execution paths (e.g., thread, process, etc.), or in any other manner The communications framework 704 facilitates communications between the client 702 and the server 706. The communications framework 704 can embody any type of communications medium, such as wired or wireless networks, utilizing any communication protocol. In an embodiment, the communications framework 704 is the Internet utilizing well known Internet protocols that facilitate communications between a server 706 and a client 702. Each client(s) 702 is coupled to one or more client data store(s) 708 that store information local to the client 702. Each server(s) 706 is coupled to one or more server data store(s) 710 that store information local to the server 706.

Figure 8:
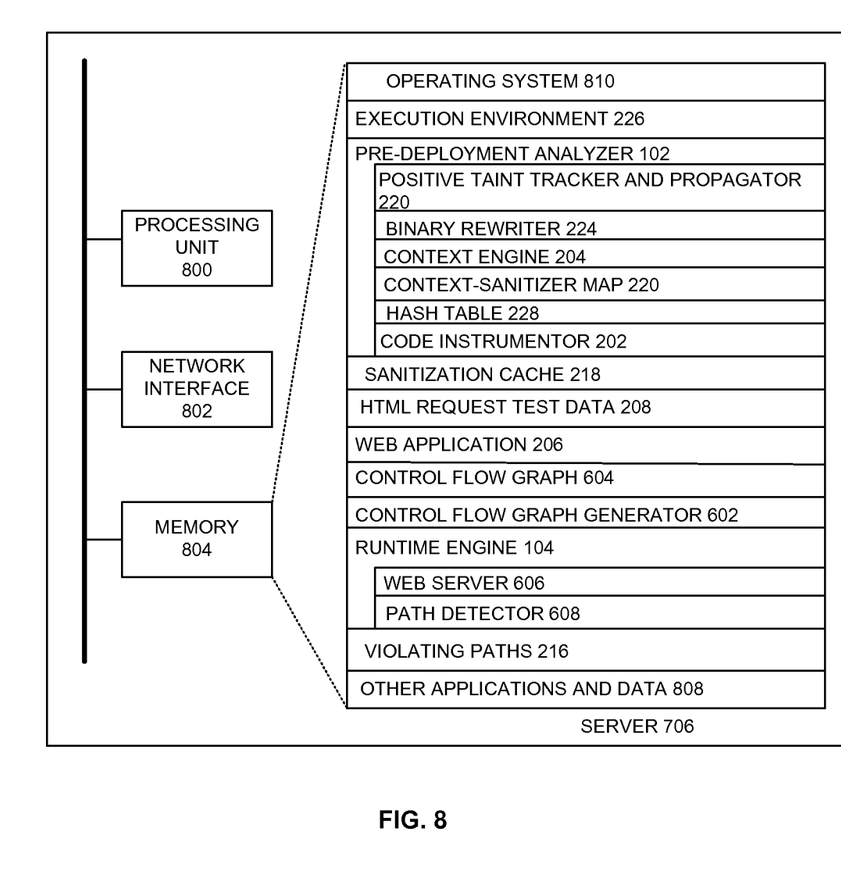
FIG. 8 illustrates an exemplary block diagram of a server implementation.

FIG. 8 illustrates a block diagram of an exemplary server 706. A server 706 has, at a minimum, a processing unit 800, a network interface 802 for facilitating network communications, and a memory 804. The memory 804 can be a computer readable medium that can store executable procedures, applications, and data. It can be any type of memory device (e.g., random access memory, read-only memory, etc.), magnetic storage, volatile storage, non-volatile storage, optical storage, DVD, CD, and the like. The memory 804 can also include one or more external storage devices or remotely located storage devices. The memory can 804 contain instructions and data as follows:

an operating system 810;
an execution environment 226;
a pre-deployment analyzer 102 having
  positive taint tracker and propagator 220;
  binary rewriter 224;
  context engine 204;
  context-sanitizer map 220;
  a hash table 228; and
  code instrumentor 202
a sanitization cache 218;
HTML request test data 208;
a web application 206;
control flow graph 604;
control flow graph generator 602;
a runtime engine 104 having
  web server 606; and
  path detector 608;
violating paths 216; and
various other applications and data 808.

Figure 9:
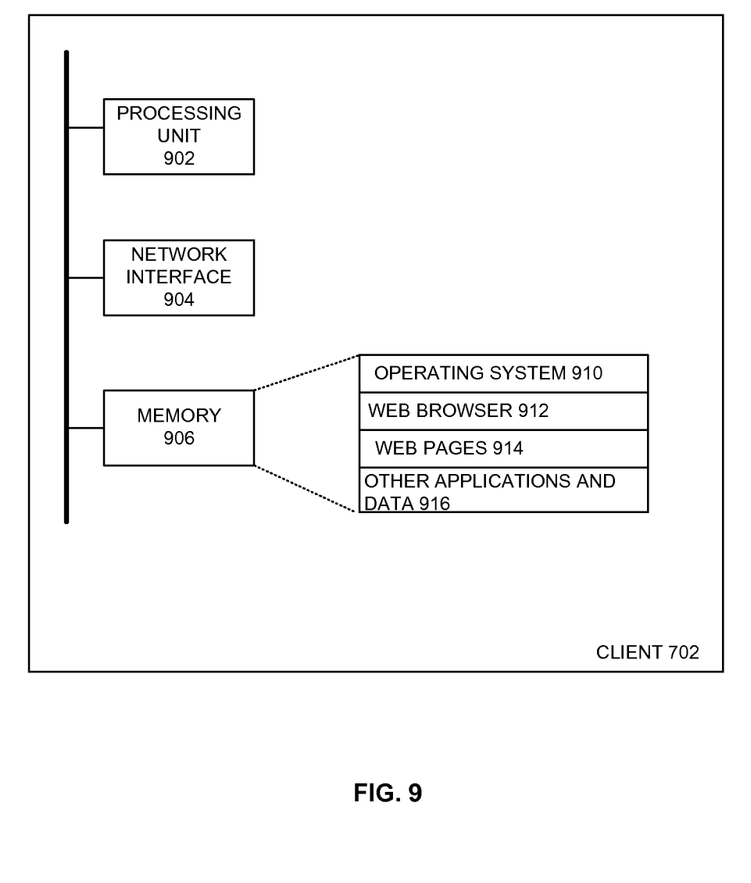
FIG. 9 illustrates an exemplary block diagram of a client implementation.

FIG. 9 illustrates a block diagram of an exemplary client 702. A client 702 has, at a minimum, a processing unit 902, a network interface 904 for facilitating network communications, and a memory 906. The memory 906 can be a computer readable medium that can store executable procedures, applications, and data. It can be any type of memory device (e.g., random access memory, read-only memory, etc.), magnetic storage, volatile storage, non-volatile storage, optical storage, DVD, CD, and the like. The memory 906 can also include one or more external storage devices or remotely located storage devices. The memory can 906 contain instructions and data as follows:

an operating system 910;
a web browser 912;
web page(s) 914; and
various other applications and data 916.

The automatic context-sensitive sanitization technique described herein mitigates cross-site scripting vulnerabilities by preventing errors that arise from mismatches in the placement of a sanitizer with an incorrect browser parsing context. The use of the browser parsing context ensures that a sequence of sanitizers will work properly to validate an untrusted input. The technique does not require modifications to a web browser or a web application. A server-side analysis automatically detects the mismatches and determines a corrected sanitization sequence prior to deployment of the web application. The violating paths and corrected sanitizer sequences are stored in separate files from the web application thereby obviating the need for modifications to the web application and a web browser. A runtime engine is utilized to apply the corrected sanitization sequence prior to outputting any untrusted inputs in a manner that does not hamper the execution of the web application.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, the runtime engine does not need to obtain the violating paths and the corrected sanitization sequences stored in the sanitization cache from the pre-deployment analyzer. The violating paths and the corrected sanitization sequences can be provided to the runtime engine from another source, such as, without limitation, a web security developer.

What is claimed:
1. A computer-implemented method comprising:
  receiving an instrumented web application including at least one special code marker, the at least one special code marker identifying a sanitizer with an untrusted input;
  identifying a browser parsing context for the untrusted input, the browser parsing context associated with a state of a web browser when the web browser is parsing at a point where the untrusted input is rendered in an output stream;
  checking if the sanitizer matches the browser parsing context for the untrusted input;

when the sanitizer does not match the browsing parsing context of the untrusted input, tagging an execution trace of the untrusted input to an output stream as a violating path, the violating path representing a path through the uninstrumented web application taken by the untrusted input that leads to outputting the untrusted input in an output stream; and generating a correct sanitizer sequence for application to the untrusted input when the uninstrumented web application executes along the violating path.

2. The method of claim 1, further comprising:
prior to receiving the instrumented web application:
   executing an uninstrumented web application with test data;
   tagging data in the uninstrumented web application as being trusted inputs; and
   identifying the untrusted input based on absence of the untrusted input being a trusted input.

3. The method of claim 2, wherein the trusted inputs are positively tainted and propagated during the execution of the uninstrumented web application.

4. The method of claim 1, further comprising:
tracking execution of the instrumented web application;
comparing the tracked execution with the violating path; and
when the tracked execution of the instrumented web application matches the violating path, applying a correct sanitizer to the untrusted input.

5. The method of claim 1, further comprising:
receiving a map including at least one browser parsing context and at least one sanitizer corresponding to a browser parsing context.

6. The method of claim 1, further comprising:
providing the violating path and the correct sanitizer sequence to a runtime engine that applies the correct sanitizer sequence prior to outputting the untrusted input.

7. The method of claim 1, wherein checking if the sanitizer matches the browser parsing context for the untrusted input further comprises:
matching the browser parsing context with a correct sanitizer; and
when the sanitizer does not match the correct sanitizer, matching the correct sanitizer with the untrusted input.

8. A system, comprising:
at least one processor; and
at least one memory comprising the following processor-executable modules:
   a code instrumentor that tags input data of a web application as an untrusted input and inserts a special code marker that marks a first sanitizer associated with the untrusted input; and
   a context engine that generates a correct sanitizer for the untrusted input when the first sanitizer does not match a browser parsing context of the untrusted input,
wherein the correct sanitizer is applied during execution of the web application, and
wherein the browser parsing context is associated with a state of a web browser when the web browser is parsing at a point where the untrusted input is rendered in an output stream.

9. The system of claim 8, the at least one memory further comprising a plurality of test data, and
wherein the code instrumentor analyzes a data flow of the web application with the plurality of test data to identify trusted inputs in the web application and identifies the untrusted input when the untrusted input is not identified as a trusted input.

10. The system of claim 8, the code instrumentor further comprising a positive taint tracker and propagator that positively taints and propagates data as trusted data and wherein the code instrumentor uses the trusted data to determine the untrusted input.

11. The system of claim 8, the code instrumentor further comprises a binary rewriter that inserts the special code marker into the web application to identify the first sanitizer.

12. The system of claim 8, wherein the code instrumentor further comprises an execution trace generator that records an execution trace of the untrusted input, and wherein the context engine identifies the execution trace as a violating path.

13. The system of claim 8, further comprising a context-sanitizer map comprising at least one browser parsing context and a sanitizer corresponding to the at least one browser parsing context, and wherein the context engine utilizes the context-sanitizer map to determine when the first sanitizer does not match the browser parsing context associated with the untrusted input.

14. A device, comprising:
at least one processor and a memory;
the at least one processor configured to:
   execute a web application having a marker associated with a first sanitizer applied to an untrusted input;
   track execution of the web application;
   compare the tracked execution of the web application with at least one violating path, the at least one violating path representing an execution trace of the web application that applies an incorrect sanitizer to the untrusted input; and
   when the tracked execution of the web application matches the at least one violating path, apply a correct sanitizer to the untrusted input, the correct sanitizer based on a browser parsing context of the untrusted input in the web application, the browser parsing context associated with a state of a web browser when the web browser is parsing at a point where the untrusted input is rendered in an output stream.

15. The device of claim 14, wherein the marker is associated with an identifier that is associated with the correct sanitizer.

16. The device of claim 14, wherein the untrusted input is tagged as untrusted based on an execution of the web application with test data that positively taints data as trusted.

17. The device of claim 14, wherein the correct sanitizer is determined from parsing the web application to determine the browser parsing context and matching the browser parsing context with a sanitizer configured for the browser parsing context.

18. The device of claim 14, storing the at least one violating path and the correct sanitizer are stored separate from the instrumented web application.

19. The device of claim 14, wherein a binary representation of the web application is instrumented with the marker prior to the execution of the web application.

20. The device of claim 14, wherein the at least one violating path is determined from a prior execution of the web application with test data.

* * * * *